United States Patent
Kobayashi et al.

(10) Patent No.: US 6,764,976 B2
(45) Date of Patent: Jul. 20, 2004

(54) DIELECTRIC CERAMIC COMPOSITION AND ELECTRONIC DEVICE

(75) Inventors: Hisashi Kobayashi, Tokyo (JP); Tomoko Uchida, Tokyo (JP); Shigeki Sato, Tokyo (JP); Takeshi Nomura, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/204,680

(22) PCT Filed: Oct. 10, 2001

(86) PCT No.: PCT/JP01/08888
§ 371 (c)(1),
(2), (4) Date: Aug. 23, 2002

(87) PCT Pub. No.: WO02/051770
PCT Pub. Date: Jul. 4, 2002

(65) Prior Publication Data
US 2003/0125193 A1 Jul. 3, 2003

(30) Foreign Application Priority Data
Dec. 25, 2000 (JP) ........................ 2000-392673

(51) Int. Cl.⁷ ............................................. X04B 35/468
(52) U.S. Cl. ...................................... 501/139; 501/138
(58) Field of Search ................................. 501/138, 139

(56) References Cited
U.S. PATENT DOCUMENTS

| | | | | |
|---|---|---|---|---|
| 6,226,172 B1 * | 5/2001 | Sato et al. | ................... | 361/311 |
| 6,403,513 B1 * | 6/2002 | Sato et al. | ................... | 501/137 |
| 6,559,084 B1 * | 5/2003 | Fujikawa et al. | ............ | 501/139 |
| 6,620,755 B2 * | 9/2003 | Saito et al. | .................. | 501/138 |

FOREIGN PATENT DOCUMENTS

| | | |
|---|---|---|
| EP | 0 977 218 A2 | 2/2000 |
| JP | A 4-242006 | 8/1992 |
| JP | A 4-292458 | 10/1992 |
| JP | A 4-292459 | 10/1992 |
| JP | A 4-295048 | 10/1992 |
| JP | A 5-109319 | 4/1993 |
| JP | A 6-243721 | 9/1994 |
| JP | A 6-340472 | 12/1994 |
| JP | A 10-25157 | 1/1998 |
| JP | A 10-270284 | 10/1998 |
| JP | A 2000-26160 | 1/2000 |
| JP | A 2000-34166 | 2/2000 |
| JP | A 2000-154055 | 6/2000 |
| JP | A 2000-154057 | 6/2000 |
| JP | A 2000-169226 | 6/2000 |
| JP | A 2000-185969 | 7/2000 |
| JP | A 2001-192264 | 7/2001 |

* cited by examiner

*Primary Examiner*—Karl Group
(74) *Attorney, Agent, or Firm*—Oliff & Berridge, PLC

(57) ABSTRACT

A dielectric ceramic composition comprising a main component composed of barium titanate, a first subcomponent including an oxide of AE (note that AE is at least one element selected from Mg, Ca, Ba and Sr), and a second subcomponent including an oxide of R (note that R is at least one element selected from Y, Dy, Ho and Er), wherein ratios of the subcomponents to 100 moles of the main component are, the first subcomponent: 0 mole<the first subcomponent<0.1 mole, and the second subcomponent: 1 mole<the second subcomponent<7 moles. According to the composition, a high specific permittivity can be attained, an insulation resistance lifetime can be maintained, the capacity-temperature characteristic can satisfy the X8R characteristic of the EIA standard, and firing in a reducing atmosphere can be realized.

12 Claims, 7 Drawing Sheets

DIELECTRIC CERAMIC COMPOSITION AND ELECTRONIC DEVICE

TECHNICAL FIELD

The present invention relates to a dielectric ceramic composition having a resistance to reduction and to a multilayer ceramic capacitor or other electronic device using the dielectric ceramic composition.

BACKGROUND ART

A multilayer ceramic capacitor, a kind of electronic devices, is broadly used as a compact, large-capacity, high reliability electronic device. The number of capacitors used in each piece of electronic equipments has also increased. In recent years, along with increasing miniaturization and improving performance of equipments, there has been increasingly stronger demand for further reductions in size, increases in capacity, reductions in price and improvements in reliability in multilayer ceramic capacitors.

Multilayer ceramic capacitors are normally produced by stacking a paste for the internal electrode layers and a paste for the dielectric layers using the sheet method or printing method, etc. and then co-firing the internal electrode layers and dielectric layers in the stack together.

As the electroconductive material for the internal electrode layers, generally Pd or Pd alloys are used, but since Pd is high in price, relatively inexpensive Ni, Ni alloys, and other base metals have come into use. When using a base metal as the electroconductive material of the internal electrode layers, firing in the air oxidizes the internal electrode layers, therefore the co-firing of the dielectric layers and internal electrode layers has to be done in a reducing atmosphere. When being fired in a reducing atmosphere, however, the dielectric layers end up being reduced and becoming lower in resistivity. Therefore, non-reducing type of dielectric materials is being developed.

In multilayer ceramic capacitors using a nonreducing dielectric ceramic composition, insulation resistence (IR) remarkably deteriorates when an electric field is applied, more specifically, there is a disadvantage of short IR lifetime, or low reliabity.

There also arises a disadvantage that, when the dielectric composition is exposed to the direct-current electric field, a specific permittivity $\varepsilon r$ declines over time. Also, a direct-current voltage can be superimposed on a capacitor and there is a disadvantage that when a direct-current voltage is applied to a capacitor having a dielectric composition wherein a strong dielectric composition is a main composition, a capacitance generally declines (DC bias characteristics). When a dielectric composition layer is made thinner in order to make a chip capacitor more compact and larger in capacitance, an electric field affecting the dielectric composition layer at the time of applying a direct-current voltage becomes strong, so the change of permittivity $\varepsilon r$ over time, that is, the capacitance change over time becomes remarkably large and DC bias characteristics decline.

Further, a capacitor is also required to have excellent temperature characteristics. In particular, in some applications, it is desired that the temperature characteristics be smooth under harsh conditions. In recent years, multilayer ceramic capacitors have come into use for various types of electronic equipments such as the engine electronic control units (ECU), crank angle sensors, antilock brake system (ABS) modules, etc., mounted in engine compartments of automobiles. These types of electronic equipment are used for stabilizing engine control, drive control, and brake control, therefore they are required to have excellent circuit temperature stability.

These types of electronic equipment are used in the environment in which the temperature falls to as low as −20° C. in the winter in cold areas or the temperature rises to as high as+130° C. in the summer while an engine is working. Recently, there has been a trend toward reduction of the number of wire harnesses used for connecting electronic apparatuses and the controlled equipment. Electronic apparatuses are also being mounted outside of the vehicles in some cases. Therefore, the environment is becoming increasingly severe for electronic apparatuses. Accordingly, capacitors used for these electronic apparatuses have to have smooth temperature characteristics over a broad temperature range.

Temperature-compensating capacitor materials superior in temperature characteristics such as, $(Sr, Ca)(Ti, Zr)O_3$ based, $Ca(Ti, Zr) O_3$ based, $Nd_2O_3\text{-}2TiO_2$ based, $La_2O_3\text{-}2TiO_2$ based, and other materials are generally known, but these compositions have extremely low specific permittivities (generally 100 or less), so it is substantially impossible to produce a capacitor having large capacity.

To create dielectric ceramic compositions having the high permittivity and smooth capacitance-temperature characteristics, compositions comprised of $BaTiO_3$ as a main component plus $Nb_2O_5$—$Co_3O_4$, MgO—Y, rare earth elements (Dy, Ho, etc.), $Bi_2O_3$—$TiO_2$, etc. are known. A mechanism of smoothing the capacitance-temperature characteristic is not completely disclosed, but the Japanese Examined Patent Publication (Kokoku) No. 7-118431 proposes the way of smoothing the capacitance-temperature characteristic by dissolving Mg and rare earth elements inside a core-shell structure. However, in an article "Key Engineering Materials Vols. 17 to 24, 157 to 158 (1999); A study on Capacitance Aging in Ni-Electroded, $BaTiO_2$— Based MLCCs with X7R Characteristics", it is reported that the core-shell structure is not essential to satisfy the X7R characteristic of the EIA Standards (−55 to 125° C., ΔC/C= ±15% or less).

Also, when looking at the temperature characteristics of a dielectric ceramic composition comprising $BaTiO_3$ as a main component, because of the Curie temperature of pure $BaTiO_3$ close to 130° C., it is extremely difficult to satisfy the R characteristic of the capacitance-temperature characteristic (ΔC/C=±15% or less) in the region higher than 130° C. Therefore, a $BaTiO_3$ based high permittivity material can only satisfy the X7R characteristic of the EIA standard (−55 to 125° C., ΔC/C=±15% or less). Satisfaction of the X7R characteristic is not good enough to be used in an electronic apparatus of an automobile which is used in the above-mentioned harsh environments. The above electronic apparatus requires a dielectric ceramic composition satisfying the X8R characteristic of the EIA standard (−55 to 150° C., ΔC/C=+15% or less).

To satisfy the X8R characteristic in a dielectric ceramic composition comprised of $BaTiO_3$ as a main component, it has been proposed to have the Curie temperature of the composition shift to the high temperature side by replacing the Ba in the $BaTiO_3$ with Bi, Pb, etc. (Japanese Unexamined Patent Publication (Kokai) No. 10-25157 and No. 9-40465). Further, it has also been proposed to satisfy the X8R characteristic by selecting a $BaTiO_3+CaZrO_3+ZnO+Nb_2O_5$ based composition (Japanese Unexamined Patent Publication (Kokai) No. 4-295048, No. 4-292458, No. 4-292459, No. 5-109319, and No. 6-243721).

In each of these compositions, however, Pb, Bi, and Zn which are easily vaporized and scattered are used, so firing in the air or another oxidizing atmosphere is a prerequisite. Therefore, there are the problems that it is not possible to use an inexpensive base metal such as Ni for the internal electrodes of the capacitor and it is necessary to use Pd, Au, Ag, or other high priced precious metals.

On the other hand, to enable to attain the high permittivity, to satisfy the X8R characteristic and to be fired in a reducing atmosphere, the present inventors have already proposed a dielectric ceramic composition described below (The Japanese Unexamined Patent Publication (Kokai) No. 2000-154057). The dielectric ceramic composition at least comprises BaTiO3 as a main component, a first subcomponent including at least one compound selected from MgO, CaO, BaO, SrO and $Cr_2O_3$, a second component expressed by $(Ba,Ca)_x Sio_{2+x}$ (note that x=0.8 to 1.2), a third subcomponent including at least one compound selected from $V_2O_5$, $MoO_3$ and $WO_3$ and a fourth subcomponent including an oxide of R1 (note that R1 is at least one element selected from Sc, Er, Tm, Yb and Lu). The ratios of the subcomponents to 100 moles of the main component are the first subcomponent: 0.1 to 3 moles, the second subcomponent: 2 to 10 moles, the third subcomponent: 0.01 to 0.5 moles and the fourth subcomponent: 0.5 to 7 moles (note that the number of moles of the fourth subcomponent is the ratio of R1 alone).

Also, the present inventors have proposed a dielectric ceramic composition described below recently (The Japanese Unexamined Patent Publication (Kokai) No. 2000-226862). The dielectric ceramic composition described in the filed specification comprises at least a main component including barium titanate, a first subcomponent including at least one compound selected from MgO, CaO, BaO, SrO and $Cr_2O_3$, a second subcomponent including silicon oxide, a third subcomponent including at least one compound selected from $V_2O_5$, $MoO_3$ and $WO_3$, a fourth subcomponent including an oxide of R1 (note that R1 is at least one element selected from Sc, Er, Tm, Yb and Lu), and a fifth subcomponent including $CaZrO_3$ or $CaO+ZrO_2$. The ratios of the subcomponents to 100 moles of the main component are the first subcomponent: 0.1 to 3 moles, the second subcomponent: 2 to 10 moles, the third subcomponent: 0.01 to 0.5 mole, the fourth subcomponent: 0.5 to 7 moles (note that the number of moles of the fourth subcomponent is the ratio of R1 alone), and the fifth subcomponent: 0<the fifth subcomponent$\leq$5 moles.

In any of the above inventions filed by the present inventors, the ratio of the first subcomponent such as MgO to 100 moles of the main component is not less than 0.1 mole.

The dielectric ceramic compositions of the above inventions filed by the present inventors are surely possible to attain the high permittivity, to satisfy the X8R characteristic, and to fire in a reducing atmosphere.

In the dielectric ceramic compositions of the above inventions, however, it was proved by the present inventors that when making a dielectric layer further thinner, it was difficult for the capacitance-temperature characteristic to satisfy the X8R characteristic and the insulation resistance lifetime was liable to decline. As to the capacitance-temperature characteristic, the capacitance change rate particularly on the high temperature side tends to increase, which is desired to be improved.

Also, among rare earth oxides, those including lanthanoids are high in price, so inexpensive substitutional elements capable of giving the same properties have been searched.

Furthermore, tendencies of higher integration and higher density of circuits have become increasingly stronger in recent years, and as a result, demands for compact and large capacitance capacitors have been increased. It has been demanded to make the dielectric layers inside further thinner.

DISCLOSURE OF THE INVENTION

An object of the present invention is to provide a dielectric ceramic composition having a high permittivity, capable of maintaining an insulation resistance lifetime, having a capacitance-temperature characteristic satisfying the X8R characteristic of the EIA standard (−55 to 150° C., $\Delta C/C=\pm 15\%$ or less), able to be fired in a reducing atmosphere. Another object of the present invention is to provide a multilayer ceramic capacitor and other electronic devices using the dielectric ceramic composition, capable of realizing more compact body and larger capacitance, particularly with thinner layers.

To attain the above object, a dielectric ceramic composition according to the present invention comprises:

a main component including barium titanate, a first subcomponent including an oxide of AE (note that AE is at least one element selected from Mg, Ca, Ba and Sr), and a second subcomponent including an oxide of R (note that R is at least one element selected from Y, Dy, Ho and Er), wherein ratios of the subcomponents to 100 moles of the main component are the first subcomponent: 0 mole<the first subcomponent<0.1 mole, and the second subcomponent: 1 mole<the second subcomponent<7 moles.

Preferably, ratios of the subcomponents to 100 moles of the main component are, the first subcomponent: 0.01 mole<the first subcomponent<0.1 mole, and the second subcomponent: 1 mole<the second subcomponent$\leq$6 moles.

Preferably, the ratio of the number of moles of the second subcomponent to the number of moles of the first subcomponent (the second subcomponent/the first subcomponent) is 10<(the second subcomponent/the first subcomponent) <500.

Preferably, the dielectric ceramic composition further comprises a sixth subcomponent including $CaZrO_3$ or $CaO+ZrO_2$, and a ratio of the sixth subcomponent to 100 moles of the main component is 0 mole<the sixth subcomponent<5 moles.

Preferably, the dielectric ceramic composition further comprises a third subcomponent including $MxSiO_3$ (note that M is at least one element selected from Ba, Ca, Sr, Li and B, x=1 when M=Ba, x=1 when M=Ca, X=1 when M=Sr, X=2 when M=Li, and X=⅔ when M=B), and a ratio of the third subcomponent to 100 moles of the main component is 2 moles$\leq$the third subcomponent$\leq$10 moles.

Preferably, the dielectric ceramic composition further comprises a fourth subcomponent including at least one compound of MnO and $Cr_2O_3$, and a ratio of the fourth subcomponent to 100 moles of the main component is 0 mole<the fourth subcomponent$\leq$0.5 mole.

Preferably, the dielectric ceramic composition further comprises a fifth subcomponent including at least one compound selected from $V_2O_5$, $MoO_3$ and $WO_3$, and a ratio of the fifth subcomponent to 100 moles of the main component is 0.01 mole$\leq$the fifth subcomponent$\leq$0.5 mole.

An electronic device according to the present invention is not particularly limited as far as it is an electronic device having a dielectric layer. An example is a multilayer ceramic capacitor element having a capacitor element body wherein dielectric layers and internal electrode layers are alternately stacked. In the present invention, the dielectric layer is comprised of any of the above dielectric ceramic compositions. A conductive material contained in the internal electrode layers is not particularly limited, for example, Ni or Ni alloy. In the present invention, the effect is large particularly when a thickness of the dielectric layer is less than about 10 µm.

Operation and Effect of the Invention

The dielectric ceramic composition according to the present invention has a high specific permittivity and a capacitance-temperature characteristic satisfying the X8R characteristic of the EIA standard. Therefore, the ceramic chip capacitor and other electronic devices using the dielectric ceramic composition of the present invention can be preferably used in an environment of being exposed to a high temperature such as an engine room of vehicles.

Also, the dielectric ceramic composition according to the present invention does not include elements which vaporize and scatter, such as Pb, Bi and Zn. Therefore, firing in a reducing atmosphere is possible.

Namely, according to the present invention, it is possible to provide a dielectric ceramic composition having a high specific permittivity, capable of maintaining an insulation resistance lifetime, having a capacitance-temperature characteristic satisfying the X8R characteristic of the EIA standard, and able to be fired in a reducing atmosphere.

When producing an electronic device such as a ceramic chip capacitor by using the dielectric ceramic composition of the present invention, Ni, Ni alloy and other base metals can be used as an internal electrode, so a low-cost electronic device can be realized. Moreover, even if the dielectric ceramic composition is fired in a reducing atmosphere, an electronic device to be obtained satisfies the X8R characteristic, wherein a capacitance aging characteristic under an application of a direct current electric field is preferable (namely, a change of the capacitance over time is small), a decline of an insulation resistance is small and reliability is high.

Namely, since an electronic device, such as a multilayer ceramic capacitor, having dielectric layers composed of the dielectric ceramic composition of the present invention can provide a stable operation in a variety of apparatuses used under severe environments, such as an electronic apparatus of vehicles, reliability of the apparatuses to which the electronic device is applied can be remarkably improved.

As explained above, the dielectric composition of the present invention can be expected to give an effect also as a method of suppressing a decline of a temperature change rate in a high temperature range caused by making the dielectric layers thinner.

Furthermore, the dielectric ceramic composition according to the present invention has a long insulation resistance lifetime, and moreover, it has a stable DC bias characteristic (dependence on direct current voltage application of the permittivity) and a TC bias characteristic (a capacitance-temperature characteristic on applying a direct current voltage).

Also, since the dielectric ceramic composition according to the present invention does not comprise any hazardous substances, such as Pb and Bi, adverse effects on an environment due to disposal and processing after use are small.

Accordingly, by using the dielectric ceramic composition of the present invention, multilayer ceramic capacitors and other electronic devices having excellent characteristics can be easily provided. Also, by using the dielectric ceramic composition according to the present invention, the X8R characteristic can be satisfied and a decline of an insulation resistance lifetime can be effectively prevented even if dielectric layers are made thinner. Thus, multilayer ceramic capacitors and other electronic devices having a more compact body and a larger capacitance can be realized, particularly by making dielectric layers further thinner. As a result, mounting those devices on highly integrated circuits can become easier.

In a dielectric ceramic composition of the related art, there was a tendency that a capacitance-temperature characteristic particularly on the high temperature side declines as the dielectric layer becomes thinner. Namely, the curve of the change rate of the capacitance-temperature at a high temperature side tends to approach to the clockwise direction. On the other hand, according to the present invention, it is possible to make the curve of the capacitance-temperature change rate on the high temperature side approach to the anticlockwise direction. When applying the phenomenon to an electronic device satisfying the X7R characteristic, a dielectric layer can be made furthermore thinner than in the related art.

As an electronic device according to the invention is not particularly limited. A multilayer ceramic capacitor, a piezoelectric element, a chip inductor, a chip varistor, a chip thermister, a chip resistance and other surface mounted chip electronic devices can be mentioned as examples.

DESCRIPTION OF THE PREFERRED EMBODIMENTS

Below, the present invention will be explained based on an embodiment shown in drawings.

Figure 1:
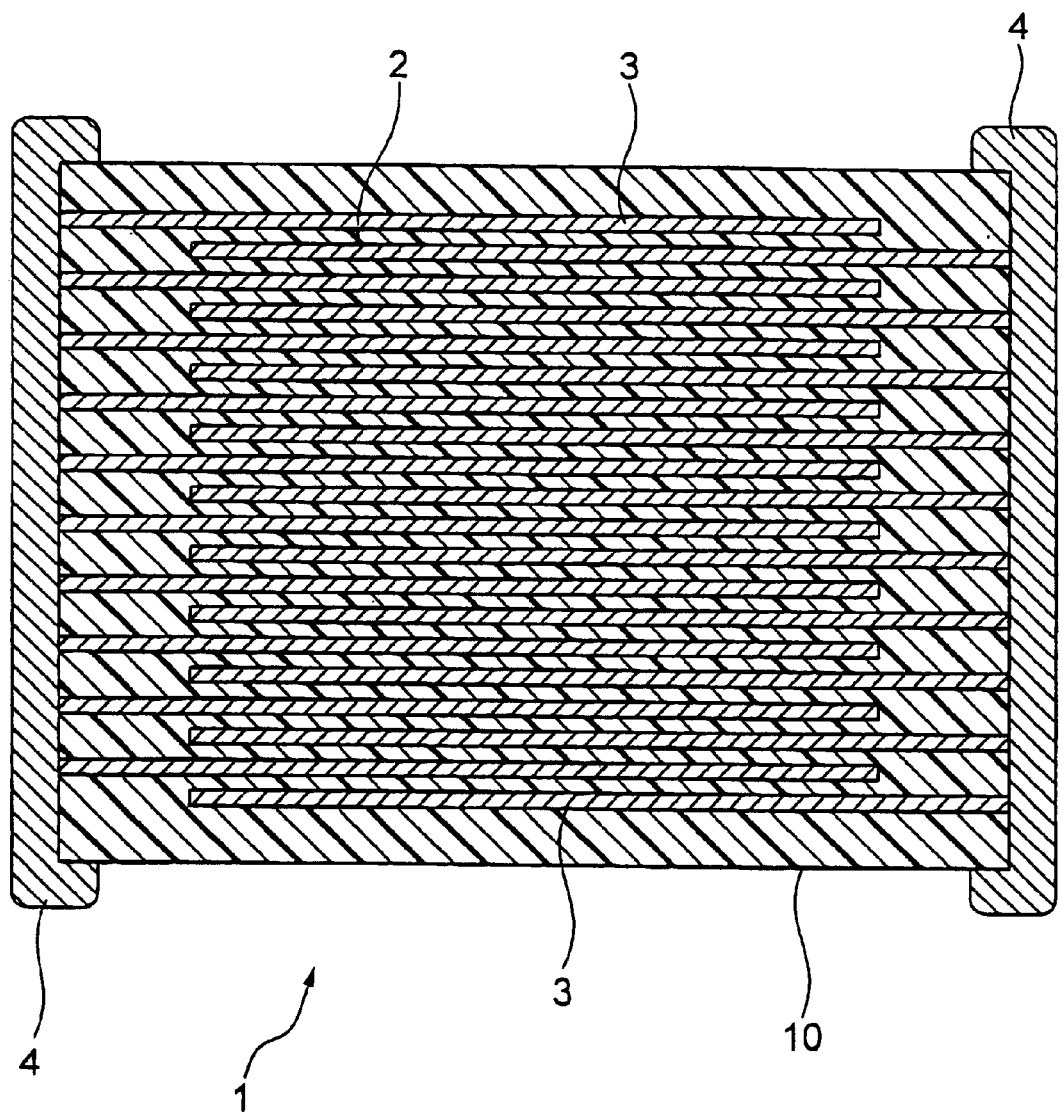
FIG. 1 is a sectional view of a multilayer ceramic capacitor according to an embodiment of the present invention.

In the present embodiment, a multilayer ceramic capacitor 1 shown in FIG. 1 is taken as an example of an electronic device by which the structure and the production method will be explained.

Multilayer Ceramic Capacitor

As shown in FIG. 1, the multilayer ceramic capacitor 1 as an electronic device according to an embodiment of the present invention has a capacitor device body 10 having a configuration of dielectric layers 2 and internal electrode layers 3 alternately stacked. At the two ends of the capacitor device body are a pair of external electrodes 4 being conductive with the internal electrode layers 3 alternately arranged inside the device body 10. The capacitor device body 10 is not limited to one particular shape, but is normally made in a parallelepiped shape. Further, the capacitor dimensions are not limited and may be made with suitable dimensions for the application. Usually, the dimensions are (0.6 to 5.6 mm)×(0.3 to 5.0 mm)×(0.3 to 1.9 mm).

The internal electrode layers 3 are stacked so that the ends thereof alternately protrude out to the surfaces of the two opposing ends of the capacitor device body 10. The pair of external electrodes 4 are formed at the two ends of the capacitor device body 10 and are connected to the exposed end faces of the alternately arranged internal electrode layers 3 so as to compose the capacitor circuit.

Dielectric Layer

The dielectric layer 2 contains a dielectric ceramic composition of the present invention.

A dielectric ceramic composition of the present invention is comprised of a main component composed of barium titanate (preferably, expressed by a composition formula $Ba_m TiO_{2+m}$, wherein $0.995 \leq m \leq 1.010$ and a ratio of Ba and Ti is $0.995 \leq Ba/Ti \leq 1.010$), a first subcomponent including an oxide of AE (note that AE is at least one element selected from Mg, Ca, Ba and Sr), and a second subcomponent including an oxide of R (note that R is at least one element selected from Y, Dy, Ho and Er).

The ratios of the subcomponents to 100 moles of the main component are the first subcomponent: 0 mole<the first subcomponent<0.1 mole and the second subcomponent: 1 mole<the second subcomponent<7 moles, preferably, the first subcomponent: 0.01 mole<the first subcomponent<0.1 mole and the second subcomponent: 1 mole<the second subcomponent$\leq$6 moles, more preferably, the first subcomponent: 0.04 mole$\leq$the first subcomponent$\leq$0.08 mole and the second subcomponent: 3 moles$\leq$the second subcomponent$\leq$5 moles.

The ratio of the number of moles of the second subcomponent to the number of moles of the first subcomponent (the second subcomponent/the first subcomponent) is preferably 10<(the second subcomponent/the first subcomponent) <500, more preferably, 37.5$\leq$(the second subcomponent/the first subcomponent)$\leq$250, further preferably, 37.5$\leq$(the second subcomponent/the first subcomponent)$\leq$125.

Note that the above ratio of the second subcomponent is not the molar ratio of the R alone, but the molar ratio of an R oxide. That is when, for example, using an oxide of Y as the second subcomponent, a ratio of the second subcomponent of 1 mole does not mean the ratio of the Y is 1 mole, but the ratio of $Y_2O_3$ is 1 mole.

In this specification, the oxides constituting the main component and the subcomponents are expressed by stoichiochemical compositions, but the oxidized state of the oxides may also deviate from the stoichiochemical compositions. The ratios of the subcomponents, however, are found by a conversion from the amounts of the metals contained in the oxides constituting the subcomponents to the oxides of the above stoichiochemical compositions.

The reasons for limiting the amounts of the above subcomponents are as follows.

The first subcomponent (an oxide of AE) exhibits an effect of smoothing the capacitance-temperature characteristic. When a content of the first subcomponent is too small, the effect becomes insufficient and the capacitance-temperature characteristic declines as a whole. On the other hand, when the content of the first subcomponent becomes large exceeding a range of the present invention, the capacitance-temperature characteristic on the high temperature side tends to decline.

The second subcomponent (an oxide of R) exhibits an effect of shifting the Curie temperature to the high temperature side and the effect of smoothing the capacitance-temperature characteristic. When a content of the second subcomponent is too small, such effects become insufficient and the capacitance-temperature characteristic declines. On the other hand, when the content is too large, sinterability tends to abruptly decline.

Particularly, by decreasing the content of the first subcomponent as much as possible and increasing the content of the second subcomponent, there is an advantage of further smoothing the capacitance-temperature characteristic.

When the ratio of the number of moles of the second subcomponent to the number of moles of the first subcomponent (the second subcomponent/the first subcomponent) is too small, the capacitance-temperature characteristic deteriorates and the X8R characteristic cannot be satisfied. On the other hand, when the ratio is too large, sinterability tends to deteriorate.

It is preferable that a sixth subcomponent including $CaZrO_3$ or $CaO+ZrO_2$ is further added to the dielectric ceramic composition of the present invention. The sixth subcomponent has effects of shifting the Curie temperature to the high temperature side, smoothing the capacitance-temperature characteristic, improving the insulation resistance (IR), improving a break-down voltage, lowering the firing temperature, etc.

A ratio of the sixth subcomponent to 100 moles of the main component is preferably 0 mole<the sixth subcomponent<5 moles, more preferably, 0 mole<the sixth subcomponent$\leq$3 moles. When the content of the sixth subcomponent is too large, there is a tendency that the IR lifetime remarkably declines and the capacitance-temperature characteristic become deteriorated.

The adding form of $CaZrO_3$ is not specifically limited and oxides comprised of Ca, such as CaO, a carbonate like $CaCO_3$, organic composite, $CaZrO_3$, etc. can be exemplified. The ratio of Ca and Zr is not limited specifically and may be determined by an extent that they do not make a solid solution with barium titanate contained in the main component, while the molar ratio of Ca with respect to Zr (Ca/Zr) is preferably 0.5 to 1.5, more preferably, 0.8 to 1.5, and further preferably, 0.9 to 1.1.

Preferably, a third subcomponent including $MxSiO_3$ is further added to the dielectric ceramic composition of the present invention. Note that M is at least one element selected from Ba, Ca, Sr, Li and B, and x=1 when M=Ba, x=1 when M=Ca, x=1 when M=Sr, x=2 when M=Li and x=$\frac{2}{3}$ when M=B. The third subcomponent mainly acts as a sintering auxiliary reagent but also has an effect of improving the defective rate of initial insulation resistance at the time of making layers thin.

The ratio of the third subcomponent with respect to 100 moles of the main component is preferably 2 moles$\leq$the third subcomponent$\leq$10 moles, more preferably, 2 moles$\leq$the third subcomponent$\leq$6 moles.

When the content of the third subcomponent ($MxSiO_3$) is too small, there is a tendency that the capacitance-temperature characteristic cannot be satisfied, the insulation resistance is deteriorated, and sinterability is remarkably deteriorated. While, when the content is too large, there is a tendency that the insulation resistance lifetime becomes insufficient and an abrupt decline of the permittivity occurs.

Note that the composition ratio of oxides in the third subcomponent may be any.

Preferably, a fourth subcomponent including at least one compound of MnO and $Cr_2O_3$ is further added to the dielectric ceramic composition of the present invention. The fourth subcomponent exhibits an effect of promoting sintering, an effect of heightening the IR and an effect of improving the IR lifetime. A ratio of the fourth subcomponent to 100 moles of the main subcomponent is preferably 0 mole<the fourth subcomponent≦0.5 mole, more preferably, 0.1 mole≦the fourth subcomponent≦0.5 mole. When the content of the fourth subcomponent (MnO and $Cr_2O_3$) is too large, the capacitance-temperature characteristic is liable to be adversely affected and the IR lifetime is liable to be deteriorated. Note that the composition ratio of oxides in the fourth subcomponent may be any.

Preferably, a fifth subcomponent including at least one compound selected from $V_2O_5$, $MoO_3$ and $WO_3$ is further added to the dielectric ceramic composition of the present invention. The fifth subcomponent exhibits an effect of smoothing the capacitance-temperature characteristic at the Curie temperature or above that and an effect of improving the IR lifetime. A ratio of the fifth subcomponent with respect to 100 moles of the main component is preferably 0.01 mole≦the fifth subcomponent≦0.5 mole, more preferably, 0.01 mole≦the fifth subcomponent≦0.2 mole. When the content of the fifth subcomponent ($V_2O_5$, $MoO_3$ and $WO_3$) is too small, there is a tendency that the above effects cannot be sufficiently obtained. While when the content is too large, the IR remarkably declines. Note that the composition ratio of oxides in the fifth subcomponent may be any.

The dielectric ceramic composition of the present invention may also comprise a sixth subcomponent including $Al_2O_3$ in addition to the above oxides. $Al_2O_3$ does not have much of an effect on the capacitance-temperature characteristic and exhibits the effect of improving sinterability, the IR and the IR lifetime. If the content of the $Al_2O_3$ is too large, however, the sinterability deteriorates and the IR falls, so the ratio of the sixth subcomponent is preferably not more than 1 mole with respect to 100 moles of the main component, and more preferably not more than 1 mole in the dielectric ceramic composition as a whole.

Note that when at least one element among Sr, Zr, and Sn replaces the Ba or Ti in the main component constituting the perovskite structure, the Curie temperature shifts to the low temperature side, so the capacitance-temperature characteristic above 125° C. deteriorates. Therefore, it is preferable not to use a $BaTiO_3$ containing these elements [for example, $(Ba, Sr)TiO_3$] as a main component. There arises, however, no particular problem by a level included as an impurity (less than 0.1 mol % of the dielectric ceramic composition as a whole).

The average crystal grain size of the dielectric ceramic composition of the present invention is not limited and may be determined in accordance with the thickness of the dielectric layers etc. from a range, for example, of 0.1 to 3 μm. There is a trend that the thinner the dielectric layers are and the smaller the average grain is in size, the more the capacity-temperature characteristic deteriorates. Therefore, the dielectric ceramic composition of the present invention is particularly effective when the average grain size has to be made small, specifically, when the average grain size is 0.1 to 0.5 μm. Further, if the average grain size is small, the IR lifetime becomes longer and the change in the capacity under a direct current electric field over time becomes smaller. Therefore, it is preferable that the average grain size is made small for the above reason.

The Curie temperature of the dielectric ceramic composition of the present invention (phase transition temperature from ferroelectrics to paraelectrics) may be changed by selecting the composition, but in order to satisfy the X8R characteristic, it is preferably at least 120° C., more preferably at least 123° C. Note that the Curie temperature may be measured using DSC (differential scanning calorimetry), etc.

The multilayer ceramic capacitor using the dielectric ceramic composition of the present invention is suitable for use as an electronic device for equipment used at over 80° C., in particular in an environment of 125 to 150° C. Further, in this temperature range, the temperature characteristic of the capacity satisfies the R characteristic of the EIA standard and also satisfies the X8R characteristic. It is also possible to simultaneously satisfy the X7R characteristic of the EIA standard (−55 to 125° C., ΔC/C=±15% or less).

In a multilayer ceramic capacitor, the dielectric layers are normally subjected to an alternating current electric field of at least 0.02V/μm, in particular at least 0.2V/μm, further at least 0.5V/μm, to generally not more than 5V/μm and a direct current electric field of not more than 5V/μm superposed over this, but the temperature characteristic of the capacitance is stable even when such electric fields are applied.

Internal Electrode Layers

The electroconductive material contained in the internal electrode layers 3 is not particularly limited, but a base metal may be used since the material constituting the dielectric layers 2 has a resistance to reduction. For the base metal used as the electroconductive material, Ni or an Ni alloy is preferable. For the Ni alloy, an alloy of at least one element selected from Mn, Cr, Co, and Al with Ni is preferable. The amount of the Ni in the alloy is preferably not less than 95 wt %.

Note that the Ni or Ni alloy may contain P and other various types of trace components in amounts of not more than about 0.1 wt % or so.

The thickness of the internal electrode layer may be suitably determined in accordance with the application etc., but is usually 0.5 to 5 μm, in particular 0.5 to 2.5 μm or so.

External Electrodes

The electroconductive material contained in the external electrodes 4 is not particularly limited, but in the present invention an inexpensive Ni, Cu, or alloys of the same may be used.

The thickness of the external electrodes may be suitably determined in accordance with the application etc., but is usually around 10 to 50 μm.

Method of Manufacturing Multilayer Ceramic Capacitor

The multilayer ceramic capacitor using the dielectric ceramic composition of the present invention, like multilayer ceramic capacitors of the related art, is produced by preparing a green chip using the usual printing method or sheet method which uses pastes, firing the green chip, then printing or transferring and firing the external electrodes. The method of manufacture will be explained in detail below.

First, a dielectric ceramic composition powder to be included in the dielectric paste is prepared and made to be a paint so as to adjust the dielectric paste.

The dielectric paste may be an organic-based paint comprised of a mixture of a dielectric ceramic composition powder and an organic vehicle and may also be a water-based paint.

For the dielectric ceramic composition powder, the above oxides or mixtures thereof or composite oxides can be used, but it is also possible to be selected from various compounds or mixtures becoming the above oxides or composite oxides after firing, such as carbonates, oxalates, nitrates, hydroxides and organic metal compounds. The content of the compounds in the dielectric ceramic composition powder may be suitably determined so as to give the above composition of the dielectric ceramic composition after firing.

An average particle size of the dielectric ceramic composition powder is normally 0.1 to 3 μm or so in a state before being made to be a paint.

The organic vehicle is comprised of a binder dissolved in an organic solvent. The binder used for the organic vehicle is not particularly limited, but may be suitably selected from ethyl cellulose, polyvinyl butyral, and other ordinary types of binders. Further, the organic solvent used is also not particularly limited and may be suitably selected from terpineol, butyl carbitol, acetone, toluene and other organic solvents in accordance with the printing method, sheet method, or other methods of use.

Further, when using a water-based paint as the dielectric paste, it is sufficient to knead a water-based vehicle comprised of a water-based binder or dispersant, etc. dissolved in water together with the dielectric layer ingredient. The water-based binder used for the water-based vehicle is not particularly limited. For example, a polyvinyl alcohol, cellulose, water-based acrylic resin, etc. may be used.

The internal electrode paste is prepared by kneading, together with the above organic vehicle, the electroconductive material comprised of the above various types of electroconductive metals and alloys or various types of oxides, an organic metal compound, resinate, etc, which become the above electroconductive materials after firing.

The external electrode paste may be prepared in the same way as in the above internal electrode paste.

The content of the organic vehicle in the above pastes is not particularly limited and may fall within the usual amount, for example, the binder may be contained in an amount of 1 to 5 wt % or so and the solvent 10 to 50 wt % or so. Further, the pastes may include, in accordance with need, various types of additives selected from dispersants, plasticizers, dielectrics, insulators, etc. The total amount of these is preferably not more than 10 wt %.

When using a printing method, the dielectric paste and the internal electrode paste are successively printed on the PET or other substrate. The result is then cut into a predetermined shape, afterwhich the pastes are peeled off from the substrate to form a green chip.

Further, when using a sheet method, a dielectric paste is used to form a green sheet, the internal electrode paste is printed on upper surface of this, afterwhich these are layered to form a green chip.

Before firing, the green chip is processed to remove the binder. This process for removing the binder may be suitably determined in accordance with a kind of a electroconductive material in the internal electrode paste, but when using Ni, Ni alloy or other base metals as the electroconductive material, it is preferable that the partial pressure of oxygen in the binder removal atmosphere is $10^{-45}$ to $10^5$ Pa. When the oxygen partial pressure is less than the range, the binder removal effect declines, while when exceeding the range, the internal electrode layers tend to become oxidized.

Further, other conditions of removing a binder are a rate of temperature rise of 5 to 300° C./hour, in particular 10 to 100° C./hour, a holding temperature is 180 to 400° C., in particular 200 to 350° C. and a temperature holding time is 0.5 to 24 hours, in particular 2 to 20 hours. Also, a firing atmosphere is preferably the air or a reducing atmosphere, and it is preferable to use the wet mixture gas of for example $N_2$ and $H_2$ as the gas in the reducing atmosphere.

The atmosphere when firing the green chip may be suitably determined in accordance with the type of electroconductive material in the internal electrode paste, but when using Ni or a Ni alloy or other base metal as the electroconductive material, the oxygen partial pressure in the firing atmosphere is preferably $10^{-7}$ to $10^{-3}$ Pa. If the oxygen partial pressure is less than this range, the electroconductive material of the internal electrode layers becomes abnormally sintered and ends up breaking in the middle in some cases. Further, if the oxygen partial pressure exceeds the above range, the internal electrode layers tend to become oxidized.

Further, the holding temperature at the time of firing is preferably 1100 to 1400° C., more preferably 1200 to 1380° C., still more preferably 1260 to 1360° C. If the holding temperature is less than the above range, the densification becomes insufficient, while if the holding temperature is over that range, there is a tendency toward breaking of the electrodes due to abnormal sintering of the internal electrode layers, deterioration of the capacity-temperature characteristic due to dispersion of the material comprising the internal electrode layers, and reduction of the dielectric ceramic composition.

The various conditions other than the above conditions are as follows: the rate of temperature rise is preferably 50 to 500° C./hour, in particular 200 to 300° C./hour, a temperature holding time is preferably 0.5 to 8 hours, in particular 1 to 3 hours, the cooling rate is preferably 50 to 500° C./hour, in particular 200 to 300° C./hour. Note that the firing atmosphere is preferably the reducing atmosphere. As the atmospheric gas, it is preferable to use for example, the wet mixed gas of $N_2$ and $H_2$.

When firing in a reducing atmosphere, the capacitor device body is preferably annealed. The annealing process is for re-oxidizing the dielectric layer. Since annealing enables the IR lifetime to be remarkably prolonged, reliability of the capacitor is improved.

The oxygen partial pressure in the annealing atmosphere is preferably not less than 0.1 Pa, in particular 0.1 to 10 Pa. If the oxygen partial pressure is less than the above range, re-oxidation of the dielectric layers is difficult, while if the oxygen partial pressure is over that range, the internal electrode layers tend to become oxidized.

The holding temperature at the time of annealing is preferably not more than 1100° C., in particular 500 to 1100° C. If the holding temperature is less than the above range, oxidation of the dielectric layers becomes insufficient, so the IR tends to become low and the IR lifetime short. On the other hand, when the holding temperature exceeds the above range, in additon to that the internal electrode layers oxidize and the capacity falls, the internal electrode layers end up reacting with the dielectric material resulting in a tendency toward deterioration of the capacity-temperature characteristic, a fall in the IR and a fall in the IR lifetime. Note that the annealing may be comprised of only a temperature rising process and temperature falling process. That is, the temperature holding time may be zero. In this case, the holding temperature is synonymous with the maximum temperature.

The various conditions other than the above conditions in annealing are as follows: the temperature holding time is preferably 0 to 20 hours, in particular 2 to 10 hours, the cooling rate is preferably 50 to 500° C./hour, in particular 100 to 300° C./hour. Note that for the atmospheric gas, preferably, the wet $N_2$ gas, etc. is used.

During the process for removing the binder, the firing, and the annealing, for example, a wetter, etc. may be used to wet the $N_2$ gas or mixed gas. In this case, the temperature of the water is preferably 5 to 75° C.

The process for removing the binder, firing, and annealing may be performed consecutively or independently. When performing these consecutively, the following process is preferable: after processing to remove the binder, the atmosphere is changed without cooling, then the temperature is raised to the holding temperature for firing, the firing performed, then the temperature is down, the atmosphere is changed when the temperature is reached to the holding temperature of the annealing, and then annealing is performed. On the other hand, when performing these independently, as to firing, it is preferable that the temperature is raised to the holding temperature at the time of the process for removing the binder in the $N_2$ gas or wet $N_2$ gas atmosphere, then the atmosphere is changed and the temperature is further raised. It is also preferable that after the body is cooled to the holding temperature of the annealing, the atmosphere is changed again to the $N_2$ gas or wet $N_2$ gas atmosphere and the cooling is continued. Further, at the time of annealing, the temperature may be raised to the holding temperature in the $N_2$ gas atmosphere, afterwhich the atmosphere is changed, or the entire annealing process may be performed in the wet $N_2$ gas atmosphere.

The capacitor device body obtained by the process mentioned above is, for example, end polished using barrel polishing or sandblasting etc., then printed or transferred with an external electrode paste and fired to form the external electrodes 4. The firing conditions of the external electrode paste are for example preferably 600 to 800° C. for 10 minutes to 1 hour or so in the wet mixed gas of $N_2$ and $H_2$. Further, in accordance with need, the surfaces of the external electrodes 4 may be formed with a covering layer using plating techniques, etc.

The produced multilayer ceramic capacitor of the present invention obtained by the above process is mounted by soldering onto a printed circuit board for use in various types of electronic equipment.

Note that an embodiment of the present invention was explained above, however, the present invention is not limited to the above embodiments and may be modified in various ways within the scope of the invention.

For example, in the above embodiments, illustration was made of a multilayer ceramic capacitor as the electronic device according to the present invention, but the electronic device according to the present invention is not limited to a multilayer ceramic capacitor and may be any device having a dielectric layer comprised of a dielectric ceramic composition of the above composition.

Next, examples wherein the embodiment of the present invention is described more specifically and the present invention will be explained further in detail. Note that the present invention is not limited to the embodiments.

EXAMPLE 1

Production of Capacitor Samples

At first, as starting materials for preparing a dielectric substance, a main component material ($BaTiO_3$) and the first to fifth subcomponents respectively having an average particle diameter of 0.1 to 1 μm were prepared. Carbonate (the first subcomponent: $MgCO_3$, the fourth subcomponent: $MnCO_3$) was used for a material of MgO and MnO, and oxides (the second subcomponent: $Y_2O_3$, the third subcomponent: $(Ba_{0.6}Ca_{0.4})SiO_3$, the fifth subcomponent: $V_2O_5$) were used as other materials. Note that $(Ba_{0.6}Ca_{0.4})SiO_3$ as the third subcomponent was prepared by performing wet mixing using a ball mill for 16 hours on $BaCO_3$, $CaCO_3$ and $SiO_2$, drying, firing at 1150° C. in the air, and further performing wet grinding using a ball mill for 100 hours.

Note that the same characteristics were also obtained by using the main component $BaTiO_3$ prepared by weighing $BaCO_3$ and $TiO_2$ respectively, performing wet mixing using a ball mill for 16 hours, drying, firing at 1100° C. in the air, and further performing wet grinding using a ball mill for 16 hours. Also, the same characteristics were obtained by using the main component $BaTiO_3$ prepared using hydrothermal crystallization powder, an oxalate method, etc.

These materials were compounded so that the composition after firing becomes as shown in Table 1 and Table 2 with respect to 100 moles of the main component $BaTiO_3$, subjected to wet mixing by using a ball mill for 16 hours and dried to be a dielectric material.

Next, a dielectric paste was prepared by mixing in a ball mill to make a paste 100 parts by weight of the previously obtained dried dielectric material, 4.8 parts by weight of acrylic resin, 40 parts by weight of methylene chloride, 20 parts by weight of ethyl acetate, 6 parts by weight of mineral spirits and 4 parts by weight of acetone.

Then, an internal electrode paste was made by kneading using a triple-roll to make a paste 100 parts by weight of Ni particles of an average particle size of 0.2 to 0.8 μm, 40 parts by weight of an organic vehicle (8 parts by weight of an ethyl cellulose resin dissolved in 92 parts by weight of butyl carbitol), and 10 parts by weight of butyl carbitol.

An external electrode paste was prepared by kneading together to make a paste 100 parts by weight of Cu particles of an average particle size of 0.5 μm, 35 parts by weight of an organic vehicle (8 parts by weight of an ethyl cellulose resin dissolved in 92 parts by weight of butyl carbitol) and 7 parts by weight of butyl carbitol.

Next, the above dielectric layer paste was used to form a green sheet having a thickness of 4.5 μm on a PET film. An internal electrode paste was printed on this, then the sheet was peeled from the PET film. Next, the obtained green sheets and protection green sheet (on which the internal electrode layer paste is not printed) were layered, adhered by means of pressure to prepare a green chip. The number of layers of the green sheet having the internal electrode was four.

Then, the green chip was cut to a predetermined size and was processed to remove the binder, fired, and annealed to obtain the multilayer ceramic fired body.

The process of removing the binder was performed under conditions where a rate of temperature rise was 15° C./hour, a holding temperature was 350° C., a holding time was 2 hours and in the atmosphere of a wet mixed gas of $N_2+H_2$ (an oxygen partial pressure is $10^{-31}$ Pa).

Firing was performed under the conditions where the rate of temperature rise was 200° C./hour, a holding temperature was 1260 to 1340° C., a holding time was 2 hours, the rate of cooling was 300° C./hour, and in an atmosphere of wet mixed gas of $N_2+H_2$ (an oxygen partial pressure was $10^{-6}$ Pa).

Annealing was performed under the conditions that a holding temperature was 1050° C., a temperature holding time was 2 hours, a cooling speed of 300° C./hour and in a $N_2$ gas atmosphere. Note that a wetter having a water temperature of 35° C. was used for wetting the atmosphere gases at the time of the binder removal processing and firing.

The external electrodes were formed by polishing the end faces of the fired multilayer ceramic body by sandblasting, then transferring the external electrode paste to the end faces and firing them in a wet $N_2+H_2$ atmosphere at 800° C. for 10 minutes, so as to obtain a sample of a multilayer ceramic capacitor having the configuration as shown in FIG. 1.

The size of the obtained samples was 3.2 mm×1.6 mm×0.6 mm, the number of dielectric layers sandwiched by the internal electrode layers was 4 and the thickness thereof was 3 μm, and the thickness of the internal electrode layer was 1.5 μm.

The characteristics below of the samples were evaluated.

Specific Permittivity (ϵr), Dielectric Loss (tanδ), Insulation Resistance (IR)

The capacitance and dielectric loss (unit of %) were measured by an LCR meter under conditions of a frequency of 1 kHz and an input signal level of 1 Vrms. Then, the specific permittivity (no unit) was calculated from the obtained capacitance, an electrode size and a distance between electrodes. Then, a direct-current voltage of 50V was applied for one minute at 25° C., the insulation resistance (IR, unit of Ωcm) at the time was measured using an insulator resistance meter (R8340A made by Advantest Co.). The result is shown in Table 1 and Table 2.

Temperature Characteristics of Capacitance

The capacitance of the capacitor samples was measured within a temperature range of −55 to 160° C., and the change rates of the capacitances (ΔC/C) at −55° C., +125° C. and 150° C. with respect to the capacitance at +25° C. were calculated. The result is shown in Table 1 and Table 2. Also, whether the X8R characteristics (within −55 to 150° C. and ΔC/C=+15%) is satisfied or not was investigated, and those which fulfill the X8R characteristics with good conditions (ΔC/C=±14.8%) are checked ⊚, those which fulfill the same (ΔC/C=±14.9% to ±15.0%) are checked ○ and those which do not fulfill were checked×in Table 1 and Table 2.

Insulation Resistance (IR) Lifetime under Direct-Current Electric Field

An acceleration test of the capacitor samples was made at 200° C. under the electric field of 15V/μm and time until an insulation resistance becomes 1MΩ or less was defined as a lifetime. The result is shown in Table 1 and Table 2.

Direct Current Insulation Break-down Strength

A direct current voltage was applied to the capacitor samples at the rate of 100V/sec. and the direct-current insulation break down strength was evaluated by detecting a leak current of 100 mA or measuring a voltage (direct-current break down voltage:unit of V) when a body was damaged. The results are shown in Table 1 and Table 2.

In Table 1 (including Table 2 to Table 11), "mE+n" indicates "m×10$^{+n}$" in values of insulation resistance (IR).

As shown in Table 1 and Table 2, in the case of making the thickness of the dielectric layer as thin as 3 μm, it was confirmed that the capacitance-temperature change rate became large and the X8R characteristic could not be satisfied when the content of the first subcomponent was too small. On the other hand, when the content of the first subcomponent was too large in the case of making the dielectric layers thinner, it was confirmed that there was a tendency that the capacitance-temperature characteristics on the high temperature deteriorates and the X8R characteristic could not be satisfied. Thus, according to the Table 1 and Table 2, it was proved that there was an effect of improving the X8R characteristic by decreasing the adding amount of the first subcomponent to less than 0.1 mole (note that more than 0 mole) particularly when the layers were made thinner.

Also, as shown in Table 1 and Table 2, it was confirmed that there was a tendency that the capacitance-temperature characteristic becamd deteriorated and the X8R characteristic could not be satisfied when the ratio of a number of moles of the second subcomponent to a moles value of the

TABLE 1

| Sample Number | Subcomponent First mole | Subcomponent Second/ First | Firing Temperature (° C.) | Specific Permittivity εr | Dielectric Loss tan δ (%) | Insulation Resistance IR (Ω cm) | Temperature Change Rate of Capacitance (ΔC/C) (%) −55° C. | +125° C. | +150° C. | X8R Characteristic | IR Lifetime (Time) | DC Breakdown Voltage (V) |
|---|---|---|---|---|---|---|---|---|---|---|---|---|
| 1* | 0.2 | 10 | 1260 | 2135 | 4.0 | 1.5E+12 | −7.6 | 2.2 | −20.5 | X | 34 | 140 |
| 2* | 0.1 | 20 | 1260 | 2150 | 3.8 | 1.5E+12 | −13.7 | 5.8 | −15.3 | X | 25 | 144 |
| 3 | 0.08 | 25 | 1260 | 2228 | 3.8 | 2E+12 | −14.1 | 6.7 | −14.8 | ⊚ | 31 | 153 |
| 4 | 0.04 | 50 | 1280 | 2042 | 5.1 | 1.5E+12 | −13.8 | 6.8 | −14.8 | ⊚ | 24 | 195 |
| 5 | 0.01 | 200 | 1280 | 2030 | 5.5 | 1.6E+12 | −14.8 | 7.2 | −15.0 | ○ | 20 | 214 |
| 6* | 0 | — | 1280 | 2034 | 5.6 | 1.8E+11 | −14.8 | 7.5 | −15.1 | X | 3 | 231 |

Samples with "*" indicate comparative examples of the present invention.
Note that
First Subcomponent: $MgCO_3$
Second Subcomponent: $Y_2O_3$ = 2.0 moles
Third Subcomponent: $(Ba_{0.6}, Ca_{0.4})SiO_3$ = 3.0 moles
Fourth Subcomponent: $MnCO_3$ = 0.374 moles
Fifth Subcomponent: $V_2O_5$ = 0.1 mole

TABLE 2

| Sample Number | Subcomponent First mole | Subcomponent Second/ First | Firing Temperature (° C.) | Specific Permittivity εr | Dielectric Loss tan δ (%) | Insulation Resistance IR (Ω cm) | Temperature Change Rate of Capacitance (ΔC/C) (%) −55° C. | +125° C. | +150° C. | X8R Characteristic | IR Lifetime (Time) | DC Breakdown Voltage (V) |
|---|---|---|---|---|---|---|---|---|---|---|---|---|
| 7* | 0.2 | 17.5 | 1340 | 2155 | 4.0 | 2.9E+12 | −6.7 | −1.1 | −17.8 | X | 29 | 159 |
| 8* | 0.1 | 35 | 1340 | 2156 | 3.9 | 2.9E+12 | −6.8 | 0.7 | −16.5 | X | 23 | 148 |
| 9 | 0.08 | 43.75 | 1340 | 2123 | 4.1 | 3.5E+12 | −7.4 | 2.1 | −11.1 | ⊚ | 62 | 184 |
| 10 | 0.04 | 87.5 | 1340 | 2281 | 4.3 | 2.6E+12 | −8.0 | 0 | −14.0 | ⊚ | 29 | 139 |
| 11 | 0.01 | 350 | 1340 | 2304 | 4.0 | 2.5E+12 | −8.1 | 1.2 | −14.9 | ○ | 30 | 151 |
| 12* | 0 | — | 1340 | 2323 | 4.2 | 2.4E+12 | −8.3 | 1.5 | −15.1 | X | 29 | 165 |

Samples with "*" indicate comparative examples of the present invention.
Note that
First Subcomponent: $MgCO_3$
Second Subcomponent: $Y_2O_3$ = 3.5 moles
Third Subcomponent: $(Ba_{0.6}, Ca_{0.4})SiO_3$ = 3.0 moles
Fourth Subcomponent: $MnCO_3$ = 0.374 mole
Fifth Subcomponent: $V_2O_5$ = 0.1 mole first subcomponent (the second component/first subcomponent) was too small or too large.

The samples of the present embodiments have the ratio of the number of moles of the second subcomponent to the moles value of the first subcomponent (the second component/first subcomponent) of within the range of 10< (the second component/first subcomponent)<500, and all of the samples exhibited preferable results.

The samples of the present embodiment were proved to satisfy the X8R characteristic, have the sufficiently high specific permittivity and the insulation resistance, and have no problem with the dielectric losses. Note that the samples of the present embodiment satisfied the X7R characteristic of the EIA standard explained above in addition to the X8R characteristic.

EXAMPLE 2

Capacitor samples were prepared in the same way as in the sample 3 of the example 1 except for changing the content of the first subcomponent to 0 mole (sample 6), 0.08 mole (sample 3), 1.0 mole (sample 1-1) and 2.06 moles (sample 1-2).

Figure 3:
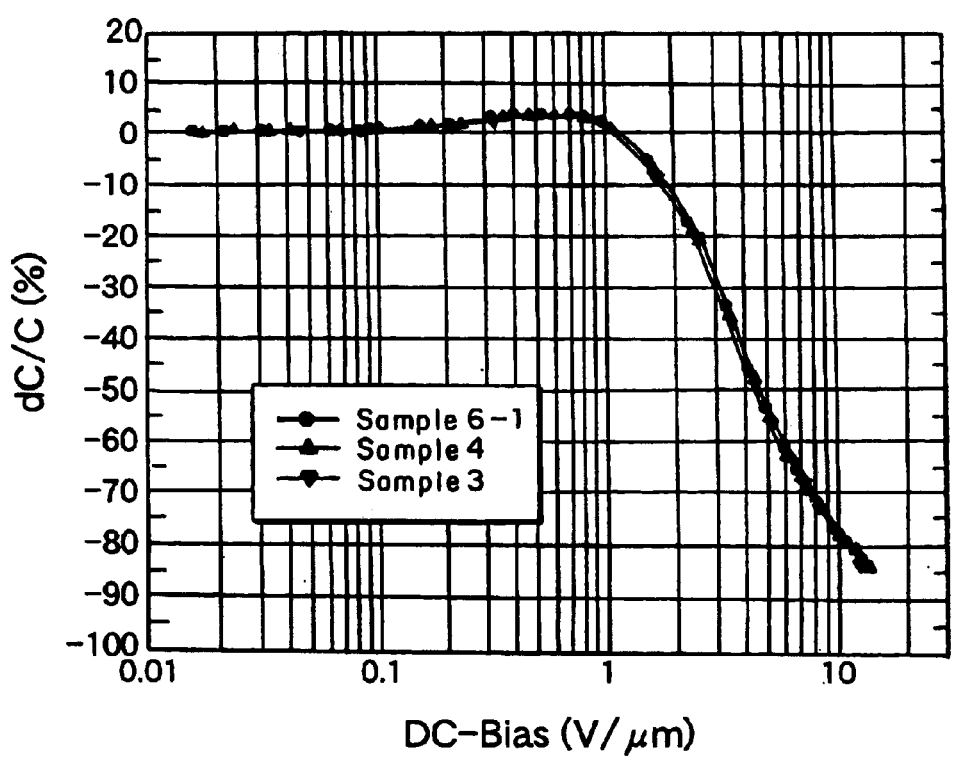
FIG. 3 is a graph of the DC bias characteristic of a capacitor sample of the example 3.

The DC bias characteristic was obtained by measuring the change of capacitance ($\Delta C/C$) on applying a direct current voltage gradually to the respective capacitor samples at a constant temperature (25° C.). The results are shown in FIG. 3. As shown in FIG. 3, it was confirmed that the capacitance was hard to be decreased even if a high voltage was applied when the content of the first subcomponent was within the range of the present invention and a stable DC bias characteristic was obtained.

EXAMPLE 4

Capacitor samples were prepared in the same way as the sample 3 of the example 1 except for changing the content of the second subcomponent as shown in Table 3. The same measurements as in the example 1 were made on the capacitor samples. The results are shown in Table 3.

TABLE 3

| | Subcomponent | | Firing | Specific | Dielectric Loss | Insulation Resistance | Temperature Change Rate of Capacitance ($\Delta C/C$) | | | X8R | IR | DC Breakdown |
|---|---|---|---|---|---|---|---|---|---|---|---|---|
| Sample | Second | Second/ | Temperature | Permittivity | tan δ | IR | (%) | | | Characteris- | Lifetime | Voltage |
| Number | mole | First | (° C.) | εr | (%) | (Ω cm) | −55° C. | +125° C. | +150° C. | tic | (Time) | (V) |
| 13* | 7 | 87.5 | 1380 | 1300 | 8.8 | 1E+10 | −6.2 | −3.5 | −16.8 | X | 1 | 52 |
| 14 | 6 | 75 | 1380 | 2194 | 4.0 | 1.7E+12 | −6.8 | −27 | −14.2 | ◎ | 44 | 138 |
| 14-1 | 5 | 62.5 | 1360 | 2170 | 3.9 | 1.8E+12 | −7.0 | −2.1 | −13.5 | ◎ | 50 | 140 |
| 15 | 4 | 50 | 1360 | 2158 | 4.0 | 1.8E+12 | −7.3 | −1.7 | −12.7 | ◎ | 56 | 158 |
| 16 | 3.5 | 43.75 | 1340 | 2123 | 4.1 | 3.5E+12 | −7.4 | 2.1 | −11.1 | ◎ | 62 | 184 |
| 3 | 2 | 25 | 1260 | 2228 | 3.8 | 2E+12 | −14.1 | 6.7 | −14.8 | ◎ | 31 | 153 |
| 18 | 1.5 | 18.75 | 1260 | 1938 | 4.0 | 2.3E+12 | −15.0 | 14.4 | −12.6 | ○ | 11 | 141 |
| 19* | 1 | 12.5 | 1240 | 1892 | 4.0 | 2.5E+12 | −16.1 | 17.8 | −11.0 | X | 5 | 127 |

Figure 2:
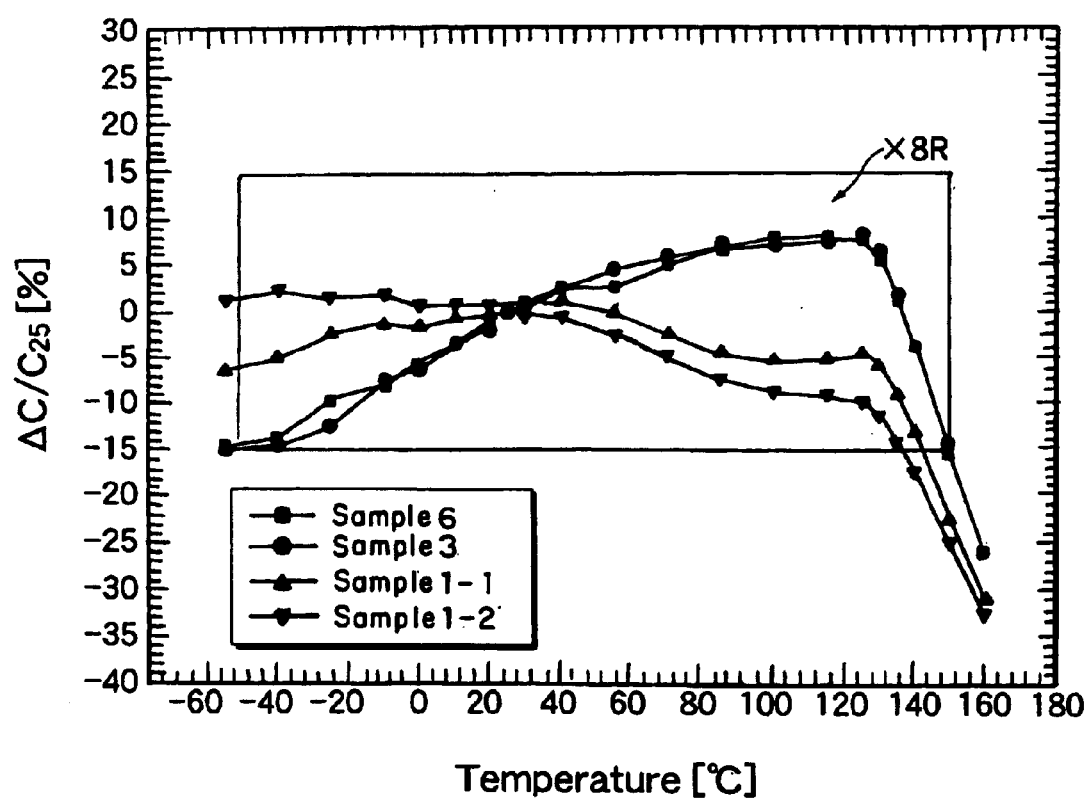
FIG. 2 is a graph of the capacitor-temperature characteristic of a capacitor sample of the example 2.

Samples with "*" indicate comparative examples of the present invention.
Note that
First Subcomponent: $MgCO_3$ = 0.08 mole
Second Subcomponent: $Y_2O_3$
Third Subcomponent: $(Ba_{0.6}, Ca_{0.4})SiO_3$ = 3.0 moles
Fourth Subcomponent: $MnCO_3$ = 0.374 mole
Fifth Subcomponent: $V_2O_5$ = 0.1 mole A capacitance was measured in a temperature range of −55 to 160° C., the change rate ($\Delta C/C$) of the capacitance at respective temperatures to the capacitance at +25° C. was calculated, and the results were plotted and shown in FIG. 2. As shown in FIG. 2, it was confirmed that as the content of the first subcomponent became decreased, the capacitance-temperature change rate on the high temperature side became small. That is, it was confirmed that by reducing the content of the first subcomponent, plot points of the capacitance-temperature change rate on the high temperature side could be made toward the anticlockwise direction in the graph.

EXAMPLE 3

Capacitor samples were prepared in the same way as the sample 3 of the example 1 except for changing the content of the first subcomponent to 0.02 mole (sample 6-1), 0.04 mole (sample 4) and 0.08 mole (sample 3).

The DC bias characteristic (dependence on direct current voltage application of permittivity) was evaluated on the capacitor samples.

DC Bias Characteristic (Dependency on Direct Current Voltage Application of Permittivity)

As shown in Table 3, when the content of the second subcomponent was too small, the effect of shifting the Curie temperature to the high temperature side and the effect of smoothing the capacitance-temperature characteristic become insufficient, so the capacitance-temperature characteristic deteriorates. While when the content of the second subcomponent is too large, sinterability tends to abruptly deteriorate.

EXAMPLE 5

Capacitor samples were prepared in the same way as the sample 3 of the example 1 except for changing the content of the second subcomponent to 1.5 mole (sample 18), 2.1 mole (sample 18-1), 2.5 mole (sample 18-2), 3.0 mole (sample 18-3) and 3.5 mole (sample 16).

Figure 4:
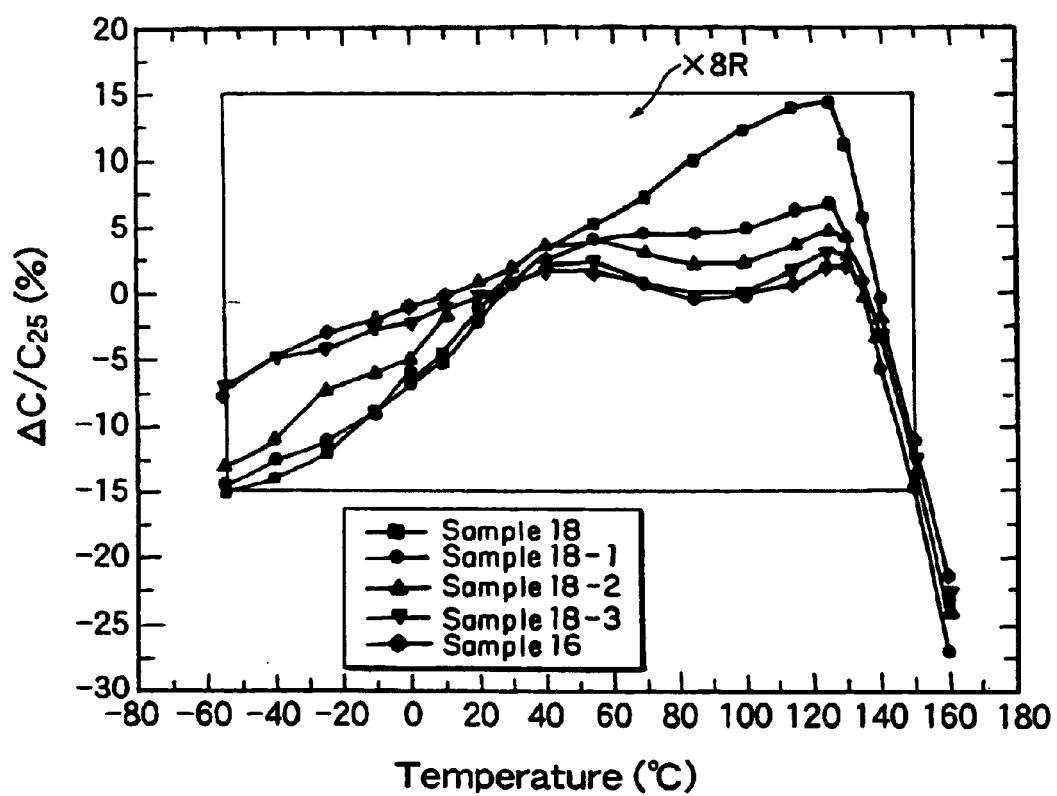
FIG. 4 is a graph of the capacitor-temperature characteristic of a capacitor sample of the example 5.

The change rate of the capacitance of these capacitor samples was measured and the results are shown in FIG. 4. In FIG. 4, a rectangular range satisfying the X8R characteristic is also indicated. Measurement of the capacitance was carried out by using an LCR meter and a measurement voltage was 1V. As shown in FIG. 4, it was confirmed that the capacitance-temperature change rate became smooth as the content of the second subcomponent increased.

Figure 5:
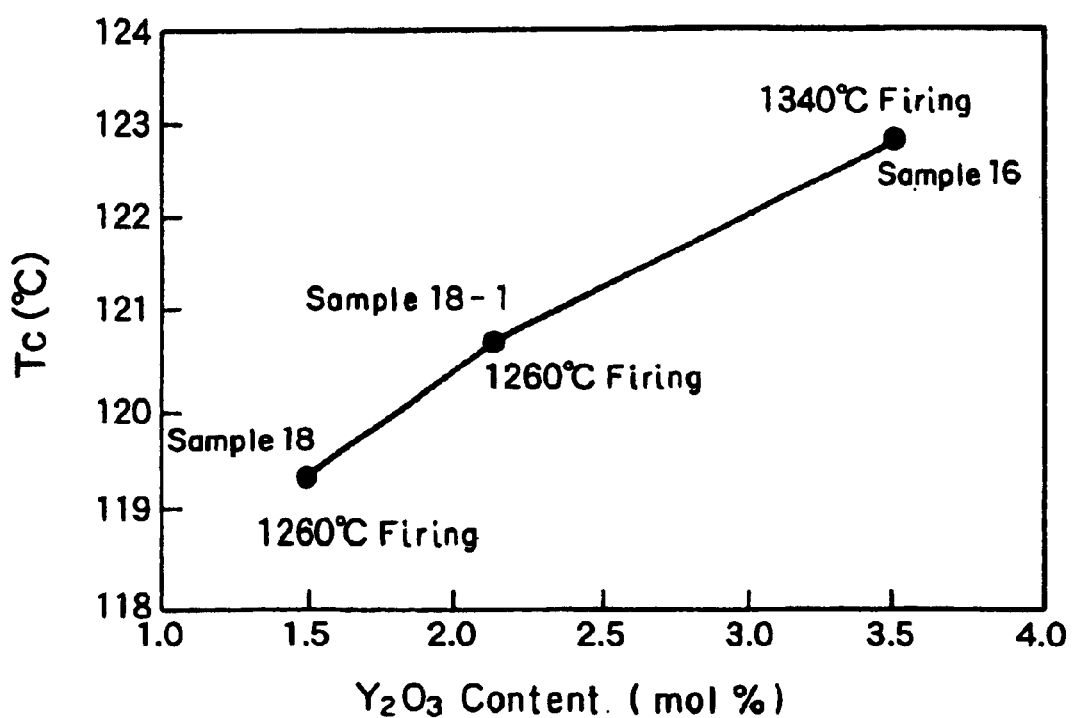
FIG. 5 is a graph of the relationship between a content of the second subcomponent and the Curie temperature in the example 5.

Also, relationship between the content of the second subcomponent ($Y_2O_3$) and the Curie temperature in the capacitor samples (samples 16, 18–1 and 18) is shown in FIG. 5. The Curie temperature (Tc) was obtained by measuring an endothermic peak by the DSC (differential scanning calorimetry). As shown in FIG. 5, it was proved that the Curie temperature shifted to the high temperature side as the content of the second subcomponent increased. As a result, as shown in FIG. 4, an improvement of the capacitance-temperature characteristic (smoothing) was observed.

EXAMPLE 6 capacitor samples were prepared in the same way as the sample 3 of the example 1 except for changing a kind of the first subcomponent as shown in Table 4. Measurements were conducted on the capacitor samples in the same way as in the example 1. The results are shown in Table 4.

As shown in Table 5, it was proved that almost equivalent characteristics could be obtained even if the kind of the second subcomponent was changed, but that particularly the Y oxide and the Ho oxide were effective to improve the IR lifetime while maintaining the X8R characteristic.

Figure 6:
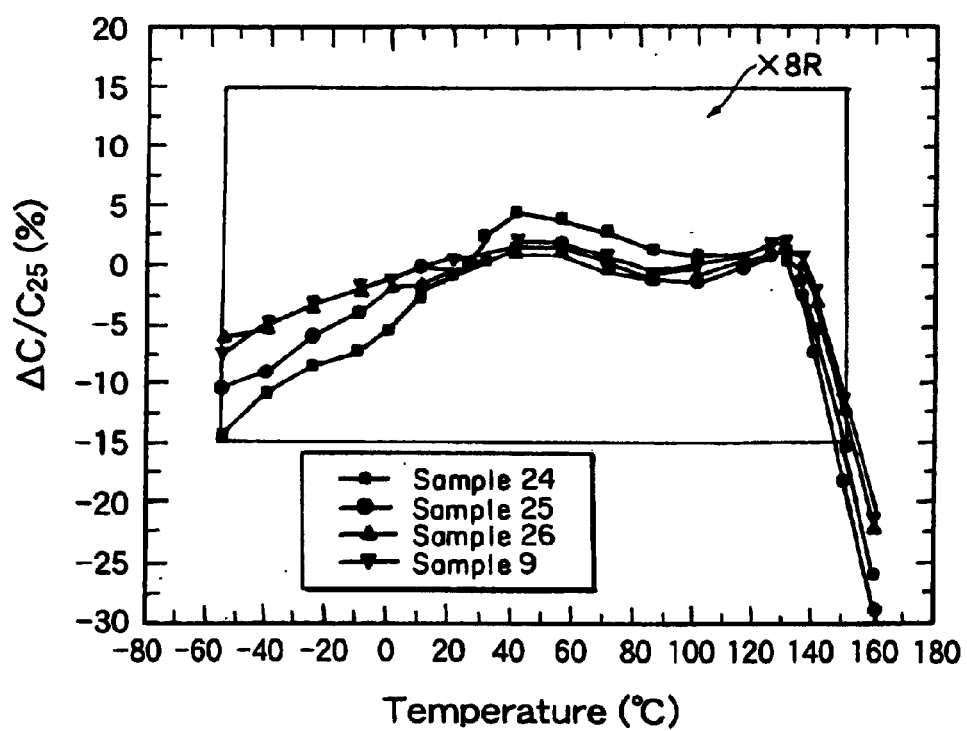
FIG. 6 is a graph of the capacitance-temperature characteristic of a capacitor sample of the example 7.

Also, the capacitance-temperature characteristic at the time of changing a kind of the second subcomponent (3.5 moles in a conversion of oxides) in the capacitor samples (samples 9, 24 to 26) is shown in FIG. 6. In FIG. 6, a rectangular range satisfying the X8R characteristic is also indicated. Measurement of the capacitance was carried out by using an LCR meter and a measurement voltage was 1V. As shown in FIG. 6, it was proved that, among Y, Dy, Ho and Er, the capacitance-temperature characteristic became smooth particularly when Y was contained.

Furthermore, the DC bias characteristic (dependence on direct current voltage application of permittivity) was evaluated by using the capacitor samples (samples 9, 24 to 26).

TABLE 4

| Sample Number | Subcomponent First Kind | Firing Temperature (° C.) | Specific Permittivity $\epsilon r$ | Dielectric Loss tan δ (%) | Insulation Resistance IR (Ω cm) | Temperature Change Rate of Capacitance (ΔC/C) (%) | | | X8R Characteristic | IR Lifetime (Time) | DC Breakdown Voltage (V) |
|---|---|---|---|---|---|---|---|---|---|---|---|
| | | | | | | −55° C. | +125° C. | +150° C. | | | |
| 3 | Mg | 1260 | 2228 | 3.8 | 2E+12 | −7.6 | 6.7 | −14.8 | ◎ | 31 | 153 |
| 21 | Ca | 1300 | 1802 | 6.5 | 2.9E+12 | −14.8 | 14.8 | −12.1 | ◎ | 15 | 138 |
| 22 | Ba | 1320 | 1706 | 4.0 | 3.3E+12 | −14.4 | 14.1 | −11.3 | ◎ | 11 | 144 |
| 23 | Sr | 1320 | 1758 | 5.0 | 3.5E+12 | −14.1 | 13.5 | −10.9 | ◎ | 9 | 160 |

Note that
First Subcomponent: = 0.08 mole
Second Subcomponent: $Y_2O_3$ = 2.0 moles
Third Subcomponent: $(Ba_{0.6}, Ca_{0.4})SiO_3$ = 3.0 moles
Fourth Subcomponent: $MnCO_3$ = 0.374 mole
Fifth Subcomponent: $V_2O_5$ = 0.1 mole As shown in Table 4, it was proved that almost equivalent characteristics could be obtained even if the kind of the first subcomponent was changed, but that particularly the Mg oxide was effective to improve the IR lifetime while maintaining the X8R characteristic.

EXAMPLE 7

Capacitor samples were prepared in the same way as the sample 9 of the example 1 except for changing a kind of the second subcomponent as shown in Table 5. Measurements were conducted on the capacitor samples in the same way as in the example 1. The results are shown in Table 5.

Figure 7:
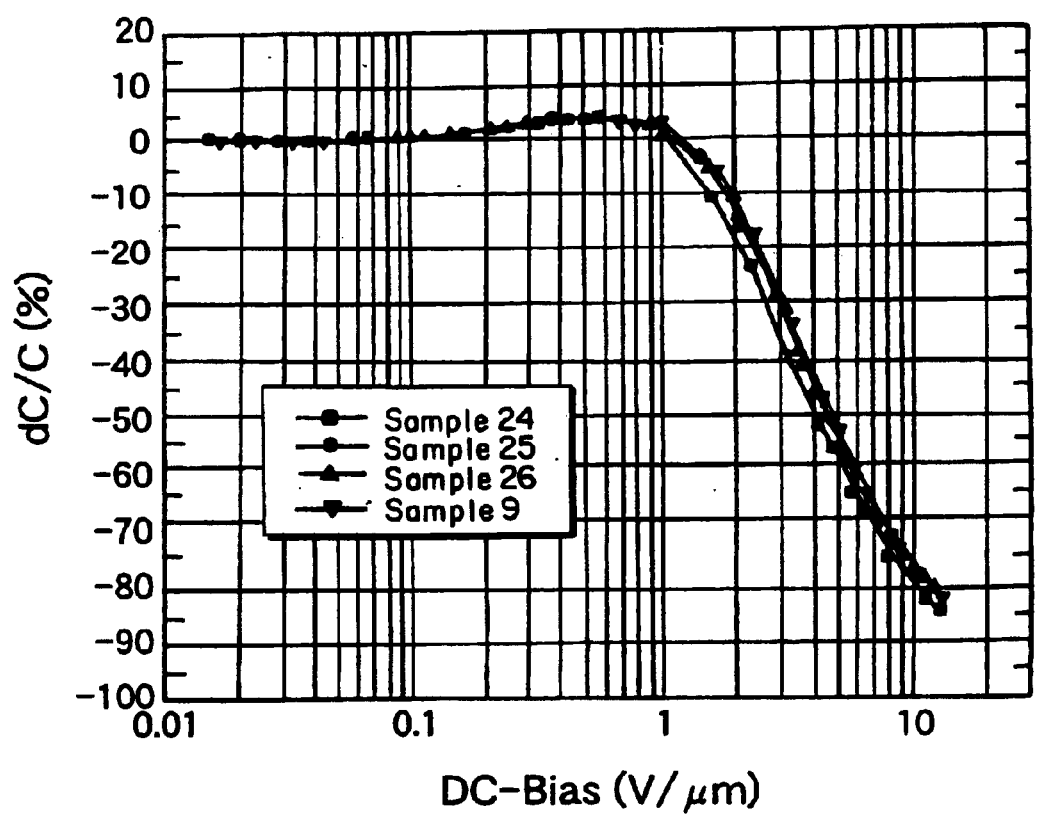
FIG. 7 is a graph of the DC bias characteristic of the capacitor sample of the example 7.

The DC bias characteristic was obtained by measuring the change of capacitance (ΔC/C) in the same way as in the example 3. The results are shown in FIG. 7. As shown in FIG. 7, it was confirmed that the capacitance was hard to be decreased even if a high voltage was applied when the content of the second subcomponent was within the range of the present invention and a stable DC bias characteristic was obtained.

EXAMPLE 7-1

Capacitor samples were prepared in the same way as the sample 14-1 of the example 4 except for changing the

TABLE 5

| Sample Number | Subcomponent Second Kind | Firing Temperature (° C.) | Specific Permittivity $\epsilon r$ | Dielectric Loss tan δ (%) | Insulation Resistance IR (Ω cm) | Temperature Change Rate of Capacitance (ΔC/C) (%) | | | X8R Characteristic | IR Lifetime (Time) | DC Breakdown Voltage (V) |
|---|---|---|---|---|---|---|---|---|---|---|---|
| | | | | | | −55° C. | +125° C. | +150° C. | | | |
| 9 | Y | 1340 | 2123 | 4.1 | 3.5E+12 | −7.4 | 2.1 | −11.1 | ◎ | 62 | 184 |
| 24 | Dy | 1280 | 2190 | 4.8 | 4.2E+12 | −14.4 | 1.2 | −14.9 | ○ | 30 | 126 |
| 25 | Ho | 1340 | 2237 | 4.0 | 4.2E+12 | −7.8 | 2.5 | −12.9 | ◎ | 62 | 114 |
| 26 | Er | 1340 | 2043 | 3.7 | 1.3E+12 | −10.4 | 1.1 | −14.3 | ◎ | 12 | 155 |

Note that
First Subcomponent: $MgCO_3$ = 0.08 mole
Second Subcomponent: = 3.5 moles in a conversion of oxides
Third Subcomponent: $(Ba_{0.6}, Ca_{0.4})SiO_3$ = 3.0 moles
Fourth Subcomponent: $MnCO_3$ = 0.374 mole
Fifth Subcomponent: $V_2O_5$ = 0.1 mole content of the sixth subcomponent as shown in Table 5-1. Measurements were conducted on the capacitor samples in the same way as in the example 1. The results are shown in Table 5-1.

Note that $CaZrO_3$ as the sixth subcomponent was prepared by performing wet mixing of $CaCO_3$ and $ZrO_2$ using a ball mill for 16 hours, drying, firing at 1150° C. in the air, and further performing wet grinding using a ball mill for 24 hours.

As shown in Table 6, when the content of the third subcomponent was too small, it was proved that there was a tendency that the capacitance-temperature characteristic could not be satisfied and that the IR and the IR lifetime became deteriorated. It was also proved that the sinterability was insufficient when the content of the third subcomponent was too small. When the sinterability is insufficient, the dielectric loss, the specific permittivity, the IR lifetime and other characteristics decline, furthermore, moisture resistance and strength also become insufficient. Note that it is

TABLE 5-1

| Sample Number | Subcomponent Sixth mole | Firing Temperature (° C.) | Specific Permittivity εr | Dielectric Loss tan δ (%) | Insulation Resistance IR (Ω cm) | Temperature Change Rate of Capacitance (ΔC/C) (%) | | | X8R Characteristic | IR Lifetime (Time) | DC Breakdown Voltage (V) |
|---|---|---|---|---|---|---|---|---|---|---|---|
| | | | | | | −55° C. | +125° C. | +150° C. | | | |
| 14-1 | 0 | 1360 | 2170 | 3.9 | 1.8E+12 | −7.0 | −2.1 | −13.5 | ⊚ | 50 | 140 |
| 26-1 | 1 | 1320 | 2010 | 3.7 | 4.2E+12 | −4.1 | −2.6 | −12.6 | ⊚ | 11 | 167 |
| 26-2 | 2 | 1320 | 1975 | 3.5 | 5.5E+12 | −1.8 | −4.7 | −12.5 | ⊚ | 7 | 184 |
| 26-3 | 3 | 1320 | 1774 | 3.3 | 9.2E+12 | −1.1 | −8.3 | −14.0 | ⊚ | 4 | 184 |
| 26-4 | 5 | 1300 | 1522 | 3.2 | 1.3E+13 | −0.8 | −11.0 | −16.8 | × | 1 | 196 |

Note that
First Subcomponent: $MgCO_3$ = 0.08 mole
Second Subcomponent: $Y_2O_3$ = 5.0 moles
Third Subcomponent: $(Ba_{0.6}, Ca_{0.4}) SiO_3$ = 3.0 moles
Fourth Subcomponent: $MnCO_3$ = 0.374 mole
Fifth subcomponent: $V_2O_5$ = 0.1 mole
Sixth Subcomponent: $CaZrO_3$ As shown in Table 5-1, it was proved that effects of smoothing the capacitance-temperature characteristic, improving the insulation resistance (IR), improving the break-down voltage, lowering the firing temperature, etc. were obtained by adding the sixth subcomponent. It was also proved that when the content of the sixth subcomponent was too large, the IR lifetime was remarkably declined and the capacitance-temperature characteristic on the high temperature side became deteriorated.

EXAMPLE 8

Capacitor samples were prepared in the same way as the sample 3 of the example 1 except for changing the content of the third subcomponent as shown in Table 6. Measurements were conducted on the capacitor samples in the same way as in the example 1. The results are shown in Table 6.

possible to improve the sinterability by further raising the firing temperature, but when firing is performed at a high temperature exceeding 1360° C., breaking of internal electrodes and a reduction of the dielectric ceramic composition easily occur. On the other hand, when the content of the third subcomponent was too large, it was proved that the specific permittivity and the IR lifetime tend to decline.

EXAMPLE 9

Capacitor samples were prepared in the same way as the sample 3 (the third subcomponent: $(Ba_{0.6} Ca_{0.4})SiO_3$) of the example 1 except for changing Mx as the third subcomponent (refer to claim 3) to $Ba_1$ ($BaSiO_3$), $Ba_{0.6}+Sr_{0.4}$ (($Ba_{0.6}Sr_{0.4}$) $SiO_3$) as shown in Table 7. Same measurements as in the example 1 were conducted on the capacitor samples. The results are shown in Table 7.

TABLE 6

| Sample Number | Subcomponent Third mole | Firing Temperature (° C.) | Specific Permittivity εr | Dielectric Loss tan δ (%) | Insulation Resistance IR (Ω cm) | Temperature Change Rate of Capacitance (ΔC/C) (%) | | | X8R Characteristic | IR Lifetime (Time) | DC Breakdown Voltage (V) |
|---|---|---|---|---|---|---|---|---|---|---|---|
| | | | | | | −55° C. | +125° C. | +150° C. | | | |
| 28** | 11 | 1260 | 1450 | 2.1 | 1.1E+12 | −12.5 | 9.2 | −12.9 | ⊚ | 4 | 73 |
| 29 | 9 | 1260 | 1832 | 2.4 | 1.3E+12 | −12.7 | 8.8 | −14.3 | ⊚ | 7 | 96 |
| 3 | 3 | 1260 | 2228 | 3.8 | 2E+12 | −14.1 | 6.7 | −14.8 | ⊚ | 31 | 153 |
| 30** | 1 | 1380 | 1419 | 10.6 | 3.7E+10 | −13.8 | 3.2 | −10.3 | ⊚ | 2 | 126 |

Samples with "**" indicate examples for reference of the present invention.
Note that
First Subcomponent: $MgCO_3$ = 0.08 mole
Second Subcomponent: $Y_2O_3$ = 2.0 moles
Third Subcomponent: $(Ba_{0.6}, Ca_{0.4}) SiO_3$
Fourth Subcomponent: $MnCO_3$ = 0.374 mole
Fifth subcomponent: $V_2O_5$ = 0.1 mole

TABLE 7

| Sample Number | Subcomponent Third Mx kind | Firing Temperature (° C.) | Specific Permittivity $\epsilon r$ | Dielectric Loss tan δ (%) | Insulation Resistance IR (Ω cm) | Temperature Change Rate of Capacitance (ΔC/C) (%) | | | X8R Characteristic | IR Lifetime (Time) | DC Breakdown Voltage (V) |
|---|---|---|---|---|---|---|---|---|---|---|---|
| | | | | | | −55° C. | +125° C. | +150° C. | | | |
| 31 | $Ba_1$ | 1340 | 2310 | 2.9 | 2.3E+12 | −13.9 | 4.9 | −13.6 | ◎ | 17 | 140 |
| 3 | $Ba_{0.6} + Ca_{0.4}$ | 1260 | 2228 | 3.8 | 2E+12 | −14.1 | 6.7 | −14.8 | ◎ | 31 | 153 |
| 32 | $Ba_{0.6} + Sr_{0.4}$ | 1300 | 2103 | 3.1 | 1.9E+12 | −14.4 | 7.3 | −14.9 | ○ | 25 | 158 |

Note that
First Subcomponent: $MgCO_3$ = 0.08 mole
Second Subcomponent: $Y_2O_3$ = 2.0 moles
Third Subcomponent: = 3.0 moles
Fourth Subcomponent: $MnCO_3$ = 0.374 mole
Fifth Subcomponent: $V_2O_5$ = 0.1 mole As shown in Table 7, it was proved that almost equivalent characteristics could be obtained even if the kind of the third subcomponent was changed, but that particularly a combination of $(Ba_{0.6}+Ca_{0.4})$ was effective on improving the IR lifetime while maintaining the X8R characteristic.

EXAMPLE 10

Capacitor samples were prepared in the same way as the sample 3 of the example 1 except for changing the content of the fourth subcomponent as shown in Table 8.

Same measurements as in the example 1 were conducted on the capacitor samples. The results are shown in Table 8.

an adverse effect on the IR lifetime and the capacitance-temperature characteristic on the high temperature side.

EXAMPLE 11

Capacitor samples were prepared in the same way as the sample 3 of the example 1 except for changing a kind of the fourth subcomponent as shown in Table 9. Same measurements as in the example 1 were conducted on the capacitor samples. The results are shown in Table 9.

TABLE 8

| Sample Number | Subcomponent Fourth mole | Firing Temperature (° C.) | Specific Permittivity $\epsilon r$ | Dielectric Loss tan δ (%) | Insulation Resistance IR (Ω cm) | Temperature Change Rate of Capacitance (ΔC/C) (%) | | | X8R Characteristic | IR Lifetime (Time) | DC Breakdown Voltage (V) |
|---|---|---|---|---|---|---|---|---|---|---|---|
| | | | | | | −55° C. | +125° C. | +150° C. | | | |
| 33** | 0.6 | 1260 | 2167 | 2.9 | 3E+12 | −14.3 | 5.7 | −15.0 | ○ | 4 | 101 |
| 3 | 0.374 | 1260 | 2228 | 3.8 | 2E+12 | −14.1 | 6.7 | −14.8 | ◎ | 31 | 153 |
| 34 | 0 | 1260 | 2250 | 3.1 | 2.7E+12 | −14.7 | 6.1 | −14.8 | ◎ | 18 | 104 |

Samples with "**" indicate examples for reference of the present invention.
Note that
First Subcomponent: $MgCO_3$ = 0.08 mole
Second Subcomponent: $Y_2O_3$ = 2.0 moles
Third Subcomponent: $(Ba_{0.6}, Ca_{0.4}) SiO_3$ = 3.0 moles
Fourth Subcomponent: $MnCO_3$
Fifth Subcomponent: $V_2O_5$ = 0.1 mole As shown in Table 8, when the content of the fourth subcomponent was too large, there was a tendency of giving

TABLE 9

| Sample Number | Subcomponent Fourth kind | Firing Temperature (° C.) | Specific Permittivity $\epsilon r$ | Dielectric Loss tan δ (%) | Insulation Resistance IR (Ω cm) | Temperature Change Rate of Capacitance (ΔC/C) (%) | | | X8R Characteristic | IR Lifetime (Time) | DC Breakdown Voltage (V) |
|---|---|---|---|---|---|---|---|---|---|---|---|
| | | | | | | −55° C. | +125° C. | +150° C. | | | |
| 35 | Mn + Cr | 1260 | 2174 | 3.4 | 1.5E+12 | −14.4 | 5.8 | −14.5 | ◎ | 30 | 142 |
| 3 | Mn | 1260 | 2228 | 3.8 | 2E+12 | −14.1 | 6.7 | −14.8 | ◎ | 31 | 153 |

TABLE 9-continued

| Sample Number | Subcomponent Fourth kind | Firing Temperature (° C.) | Specific Permittivity εr | Dielectric Loss tan δ (%) | Insulation Resistance IR (Ω cm) | Temperature Change Rate of Capacitance (ΔC/C) (%) −55° C. | +125° C. | +150° C. | X8R Characteristic | IR Lifetime (Time) | DC Breakdown Voltage (V) |
|---|---|---|---|---|---|---|---|---|---|---|---|
| 36 | Cr | 1240 | 2139 | 3.1 | 1.7E+12 | −14.2 | 6.7 | −14.6 | ⊚ | 28 | 137 |

Note that
First Subcomponent: $MgCO_3$ = 0.08 mole
Second Subcomponent: $Y_2O_3$ = 2.0 moles
Third Subcomponent: $(Ba_{0.6}, Ca_{0.4})SiO_3$ = 3.0 moles
Fourth Subcomponent: 0.374 mole (Note that sample 35 = Mn(0.2 mole) + Cr(0.174 mole))
Fifth Subcomponent: $V_2O_5$ = 0.1 mole As shown in Table 9, it was proved that almost equivalent characteristics could be obtained even if the kind of the fourth subcomponent was changed, but that particularly the case of Mn was effective on improving characteristics of the specific permittivity, the IR and direct current break-down voltage while maintaining the X8R characteristic.

EXAMPLE 12

Capacitor samples were prepared in the same way as the sample 3 of the example 1 except for changing the content of the fifth subcomponent as shown in Table 10. Same measurements as in the example 1 were conducted on the capacitor samples. The results are shown in Table 10.

Curie temperature and over that and an adverse effect was liable to be given on the IR lifetime. While when the content of the fifth subcomponent was too large, there was a tendency that the specific permittivity and the IR became deteriorated.

EXAMPLE 13

Capacitor samples were prepared in the same way as the sample 3 of the example 1 except for changing a kind of the

TABLE 10

| Sample Number | Subcomponent Fifth mole | Firing Temperature (° C.) | Specific Permittivity εr | Dielectric Loss tan δ (%) | Insulation Resistance IR (Ω cm) | Temperature Change Rate of Capacitance (ΔC/C) (%) −55° C. | +125° C. | +150° C. | X8R Characteristic | IR Lifetime (Time) | DC Breakdown Voltage (V) |
|---|---|---|---|---|---|---|---|---|---|---|---|
| 37** | 0.6 | 1260 | 1540 | 4.5 | 7.3E+09 | −10.5 | 9.2 | −11.7 | ⊚ | 43 | 96 |
| 38 | 0.4 | 1260 | 1836 | 3.7 | 1.4E+11 | −14.5 | 9.0 | −14.0 | ⊚ | 38 | 114 |
| 3 | 0.1 | 1260 | 2228 | 3.8 | 2E+12 | −14.1 | 6.7 | −14.8 | ⊚ | 31 | 153 |
| 39** | 0 | 1260 | 2530 | 2.9 | 3.8E+12 | −13.6 | 5.2 | −15.0 | ○ | 7 | 145 |

Samples with "**" indicate examples for reference of the present invention.
Note that First Subcomponent: $MgCO_3$ = 0.08 mole
Second Subcomponent: $Y_2O_3$ = 2.0 mole
Third Subcomponent: $(Ba_{0.6}, Ca_{0.4})SiO_3$ = 3.0 moles
Fourth Subcomponent: $MnCO_3$ = 0.374 mole
Fifth Subcomponent: $V_2O_5$ As shown in Table 10, it was proved that when the content of the fifth subcomponent was too small, the capacitance-temperature characteristic could not be made smooth at the fifth subcomponent as shown in Table 11. Same measurements as in the example 1 were conducted on the capacitor samples. The results are shown in Table 11.

TABLE 11

| Sample Number | Subcomponent Fifth kind | Firing Temperature (° C.) | Specific Permittivity εr | Dielectric Loss tan δ (%) | Insulation Resistance IR (Ω cm) | Temperature Change Rate of Capacitance (ΔC/C) (%) −55° C. | +125° C. | +150° C. | X8R Characteristic | IR Lifetime (Time) | DC Breakdown Voltage (V) |
|---|---|---|---|---|---|---|---|---|---|---|---|
| 40 | Mo | 1260 | 1913 | 6.2 | 3.3E+11 | −14.0 | 5.9 | −14.7 | ⊚ | 12 | 148 |
| 3 | V | 1260 | 2228 | 3.8 | 2E+12 | −14.1 | 6.7 | −14.8 | ⊚ | 31 | 153 |

TABLE 11-continued

| Sample Number | Subcomponent Fifth kind | Firing Temperature (° C.) | Specific Permittivity $\epsilon_r$ | Dielecteric Loss tan δ (%) | Insulation Resistance IR (Ω cm) | Temperature Change Rate of Capacitance (ΔC/C) (%) | | | X8R Characteristic | IR Lifetime (Time) | DC Breakdown Voltage (V) |
|---|---|---|---|---|---|---|---|---|---|---|---|
| | | | | | | −55° C. | +125° C. | +150° C. | | | |
| 41 | W | 1280 | 1844 | 7.5 | 2.7E+11 | −13.7 | 4.2 | −15.0 | ○ | 10 | 131 |

Note that
First Subcomponent: $MgCO_3$ = 0.08 mole
Second Subcomponent: $Y_2O_3$ = 2.0 moles
Third Subcomponent: $(Ba_{0.6}, Ca_{0.4})SiO_3$ = 3.0 moles
Fourth Subcomponent: $MnCO_3$ = 0.374 mole
Fifth Subcomponent: = 0.1 mole As shown in Table 11, it was proved that almost equivalent characteristics could be obtained even if the kind of the fifth subcomponent was changed, but that particularly the V oxide was effective on improving characteristics of the specific permittivity and the IR lifetime.

What is claimed is:

1. A dielectric ceramic composition comprising:

a main component including barium titanate, a first subcomponent including an oxide of AB (note that AB is at least one element selected from Mg, Ca, Ba and Sr), and a second subcomponent including an oxide of R (note that R is at least one element selected from Y, Dy, Ho and Er), wherein ratios of the subcomponents to 100 moles of said main component are:

the first subcomponent: 0 mole<the first subcomponent<0.1 mole, and the second subcomponent: 1 mole<the second subcomponent<7 moles.

2. The dielectric ceramic composition as set forth in claim 1, wherein a ratio of the number of moles of the second subcomponent to the number of moles of the first subcomponent (the second subcomponent/the first subcomponent) is 10<(the second subcomponent/the first subcomponent)<500.

3. The dielectric ceramic composition as set forth in claim 1, further comprising an additional subcomponent including $CaZrO_3$ or $CaO+ZrO_2$, wherein a ratio of said additional subcomponent to 100 moles of said main component is 0 mole<the additional subcomponent<5 moles.

4. The dielectric ceramic composition as set forth in claim 1, further comprising an additional subcomponent including $MxSiO_3$ (note that M is at least one element selected from Ba, Ca, Sr, Li and B, x=1 when M=Ba, x=1 when M=Ca, x=1 when M=Sr, x=2 when M=Li and x=⅔ when M=B), wherein a rate of said additional subcomponent to 100 moles of said main component is 2 moles the additional subcomponent≦10 moles.

5. The dielectric ceramic composition as set forth in claim 1, further comprising an additional subcomponent including at least one compound of MnO and $Cr_2O_3$, wherein a rate of said additional subcomponent to 100 moles of said main component is 0 mole<the additional subcomponent 0.5 mole.

6. The dielectric ceramic composition as set forth in claim 1, further comprising an additional subcomponent including at least one compound selected from $V_2O_5$, $MoO_3$ and $WO_3$, wherein a ratio of said additional subcomponent to 100 moles of said main component is 0.01 mole the additional subcomponent 0.5 mole.

7. An electronic device having a dielectric layer comprised of a dielectric ceramic composition, wherein:

said dielectric ceramic composition comprises a main component including barium titanate, a first subcomponent including an oxide of AR (note that AR is at least one element selected from Mg, Ca, Ba and Sr), and a second subcomponent including an oxide of R (note that R is at least one element selected from Y, Dy, Ho and Er), wherein ratios of the subcomponents to 100 moles of the main component are:

the first subcomponent: 0 mole<the first subcomponent<0.1 mole, and the second subcomponent: 1 mole<the second subcomponent<7 moles.

8. The electronic device as set forth in claim 7, wherein a ratio of the number of moles of the second subcomponent to the number of moles of the first subcomponent (the second subcomponent/the first subcomponent) is 10<(the second subcomponent/the first subcomponent)<500.

9. The electronic device as set forth in claim 7, further comprising an additional subcomponent including $CaZrO_3$ or $CaO+ZrO_2$, wherein a ratio of said additional-subcomponent to 100 moles of said main component is 0 mole<the additional subcomponent<5 moles.

10. The electronic device as set forth in claim 7, further comprising an additional subcomponent including $MxSiO_3$ (note that M is at least one element selected from Ba, Ca, Sr, Li and B, and x=1 when M=Ba, x=1 when M=Ca, x=1 when M=Sr, x=2 when M=Li and x=⅔ when M=B), wherein a ratio of said additional subcomponent to 100 moles of said main component is 2 moles the third-additional-subcomponent 10 moles.

11. The electronic device as set forth in claim 7, further comprising an additional subcomponent including at least one compound of MnO and $Cr_2O_3$, wherein a ratio of said additional subcomponent to 100 moles of said main component is 0 mole<the additional subcomponent 0.5 mole.

12. The electronic device as set forth in claim 7, further comprising an additional subcomponent including at least one compound selected from $V_2O_5$, $MoO_3$ and $WO_3$, wherein a ratio of said additional subcomponent to 100 moles of said main component is 0.01 mole the additional subcomponent 0.5 mole.

* * * * *